(12) United States Patent
Takeda (10) Patent No.: US 7,907,489 B2
(45) Date of Patent: Mar. 15, 2011

(54) OPTICAL-DISC DISCRIMINATION METHOD AND OPTICAL DISC APPARATUS

(75) Inventor: Masakazu Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 635 days.

(21) Appl. No.: 11/905,337

(22) Filed: Sep. 28, 2007

(65) Prior Publication Data

US 2008/0080349 A1 Apr. 3, 2008

(30) Foreign Application Priority Data

Oct. 2, 2006 (JP) .................................. 2006-270534

(51) Int. Cl.
*G11B 7/00* (2006.01)
(52) U.S. Cl. .................................. 369/53.23; 369/44.37
(58) Field of Classification Search .................. None
See application file for complete search history.

(56) References Cited

U.S. PATENT DOCUMENTS

| | | | | |
|---|---|---|---|---|
| 6,278,672 | B1 * | 8/2001 | Kobayashi | 369/53.23 |
| 2006/0077840 | A1 | 4/2006 | Ma et al. | 369/53.1 |
| 2007/0211587 | A1 * | 9/2007 | Kosaki | 369/44.29 |
| 2008/0151722 | A1 * | 6/2008 | Hara et al. | 369/53.23 |

FOREIGN PATENT DOCUMENTS

| | | |
|---|---|---|
| EP | 1 626 397 A2 | 2/2006 |
| EP | 1 675 116 A2 | 6/2006 |
| JP | A-2000-311357 | 11/2000 |
| JP | 2006-120210 | 5/2006 |
| JP | A-2006-134367 | 5/2006 |

\* cited by examiner

*Primary Examiner* — Joseph Haley (74) *Attorney, Agent, or Firm* — Morgan, Lewis & Bockius LLP (57) ABSTRACT

In an HD-DVD, record densities are different between in a lead-in area and in a data area. On the other hand, in a DVD, the record densities of a lead-in area and a data area are equal. In discriminating an optical disc between the HD-DVD and the DVD, a light beam having a wavelength for the HD-DVD or for the DVD is projected onto the respective areas of the lead-in area and the data area, and a comparison is made between the amplitude of a tracking error (TE) signal obtained on the basis of reflected light from the lead-in area and that of a TE signal obtained on the basis of reflected light from the data area. When the difference between both the amplitudes is within a predetermined range, the optical disc is discriminated as the DVD, and when the difference between both the amplitudes is larger than the predetermined range, the optical disc is discriminated as the HD-DVD.

2 Claims, 5 Drawing Sheets

OPTICAL-DISC DISCRIMINATION METHOD AND OPTICAL DISC APPARATUS

The present application is based on Japanese Patent Application No. 2006-270534 filed on Oct. 2, 2006, the contents of which are incorporated herein by reference.

BACKGROUND OF THE INVENTION

1. Field of the Invention

The present invention relates to a method for discriminating the sorts of optical discs. Also, the invention relates to an optical disc apparatus which is furnished with a method for discriminating the sorts of optical discs.

2. Description of Related Art

In late years, DVDs (Digital Versatile Discs: multipurpose discs) have come into wide use. Recently, in order to further increase the information quantity of an optical disc, researches on the higher density of the optical disc have been made, and an optical disc heightened in density, such as HD-DVD (High Definition DVD: high density DVD), has also appeared.

The record and reproduction of the information of an optical disc are performed in an optical disc apparatus. Optical disc apparatuses each of which can record and reproduce information onto and from a plurality of sorts of optical discs by the single apparatus have been developed in large numbers, and the optical disc apparatus which copes with the two sorts of optical discs of the DVD and the HD-DVD has also been proposed. Besides, in such an optical disc apparatus coping with the plurality of sorts of optical discs, when the optical disc is inserted into the apparatus, the sort of the optical disc is first discriminated.

Various methods have heretofore been proposed as methods for discriminating the sorts of the optical discs, and they are, for example, discrimination methods introduced in JP-A-2006-134367 and JP-A-2000-311357. According to the methods, a laser beam is projected, and an objective for condensing the laser beam onto an optical disc is moved in the direction of an optic axis, so as to obtain a focus error signal (FE signal) on this occasion. In addition, the sort of the optical disc is discriminated on the basis of the generation timing of the S-shaped waveform of the FE signal, the amplitude thereof, etc.

However, when the DVD and the HD-DVD are to be discriminated in accordance with the method stated in JP-A-2006-134367, that is, on the basis of the generation timing of the S-shaped waveform of the FE signal, the generation timings of the S-shaped waveforms of the DVD and the HD-DVD become the same for the reason that both the thicknesses of transparent cover layers for protecting record layers are equal to be 0.6 mm, in the DVD and the HD-DVD. Accordingly, the discrimination between the DVD and the HD-DVD becomes difficult.

Besides, in the configuration wherein the optical discs are discriminated by utilizing the magnitude of the amplitude of the S-shaped waveform as stated in JP-A-2006-134367 or JP-A-2000-311357, a plurality of sorts of wavelengths need to be changed-over for the laser beam which is projected onto the optical disc in order to discriminate the sorts of the optical discs. In this regard, a time period expended on the discrimination of the optical disc becomes long in some cases, for such a reason that, in changing-over the sorts of the wavelengths of the laser beam, a wait time is required until the output of a laser beam source is stabilized. In this respect, the wavelengths of the light sources which are used for the DVD and the HD-DVD are different (for example, 650 nm for the DVD, and for example, 405 nm for the HD-DVD), and the optical disc apparatus which can record and reproduce information for the DVD and the HD-DVD has the problem that a long time is expended on the discrimination between the DVD and the HD-DVD.

SUMMARY OF THE INVENTION

In view of the above problems, an object of the present invention is to provide an optical-disc discrimination method which can discriminate two sorts of optical discs without changing-over light sources, even when the thicknesses of protective layers for protecting record layers are equal. Besides, another object of the invention is to provide an optical disc apparatus to which such an optical-disc discrimination method is applied.

In order to accomplish the objects, the invention consists in an optical-disc discrimination method for discriminating a first optical disc which includes a record layer for recording data therein, and a protective layer for protecting the record layer, and in which the record layer has at least a first area and a second area that are formed at equal record densities; and a second optical disc which includes the record layer and the protective layer, and in which the record layer has at least a first area and a second area that are formed at different record densities; characterized by including the steps of projecting a light beam which has a wavelength for the first optical disc or for the second optical disc, onto respective areas of the first area and the second area, and detecting respective reflected lights which are reflected from the first area and the second area on the basis of the projections of the light beam, by a photodetection portion; executing predetermined processing for electric signals which are outputted from the photodetection portion; and discriminating whether an optical disc is the first optical disc or the second optical disc, on the basis of a result of the predetermined processing for the reflected light from the first area, and a result of the predetermined processing for the reflected light from the second area.

According to this method, the two optical discs can be discriminated with only the light beam emitted from one light source, by utilizing the fact that the formations of the record densities in the first area and the second area are different between in the first optical disc and in the second optical disc. Therefore, even when the thicknesses of the protective layers for protecting the record layers are equal, the discrimination between the first optical disc and the second optical disc can be accurately performed without changing-over light sources.

Besides, the invention may well consist in the optical-disc discrimination method of the above configuration, wherein thicknesses of the protective layers of the first optical disc and the second optical disc are equal; and the first areas are data areas in which data are recorded, and the second areas are lead-in areas in which management information items for managing the data areas are recorded.

In the existing standards, the configuration of the first optical disc corresponds to that of a DVD, and the configuration of the second optical disc corresponds to that of an HD-DVD. In accordance with this configuration, accordingly, the discrimination between the HD-DVD and the DVD in which the thicknesses of the protective layers for protecting the record layers are equal can be accurately performed without changing-over light sources.

Besides, the invention may well consist in the optical-disc discrimination method of the above configuration, wherein the predetermined processing is a process which obtains an amplitude of a tracking error signal; and the sort of the optical disc is discriminated by comparing the amplitude of the tracking error signal in the first area and the amplitude of the tracking error signal in the second area.

According to this method, using a configuration which has heretofore been included in an optical disc apparatus, it is permitted to provide a discrimination method which can accurately discriminate the first optical disc and the second optical disc without changing-over light sources, even when the thicknesses of the protective layers for protecting the record layers are equal.

Besides, the invention may well consist in the optical-disc discrimination method of the above configuration, wherein the record density of the first area of the second optical disc is formed to be higher than that of the second area of the second optical disc, and the record density of the second area of the second optical disc is formed to be substantially equal to those of the first and second areas of the first optical disc; the light beam which is projected onto the respective areas of the first area and the second area is a light beam of a wavelength for use in reproduction of the first optical disc; and the predetermined processing is a process which permits a judgment on whether or not read of information is possible, as to each of the first area and the second area.

Also in the case of this configuration, using a configuration which has heretofore been included in an optical disc apparatus, it is permitted to provide a discrimination method which can accurately discriminate the first optical disc and the second optical disc without changing-over light sources, even when the thicknesses of the protective layers for protecting the record layers are equal.

Besides, in order to accomplish the objects, the invention consists in an optical disc apparatus including a plurality of light sources which emit light beams of different wavelengths, respectively; an objective which condenses the light beam emitted from the light source, onto a record layer of an optical disc; a photodetection portion which receives reflected light reflected from the record layer; and a disc discrimination portion which discriminates the optical disc inserted into the apparatus; characterized in that the apparatus is configured so as to be capable of reproduction or record and reproduction of a first optical disc which includes a record layer for recording data therein, and a protective layer for protecting the record layer, and in which the record layer has at least a first area and a second area that are formed at equal record densities; and a second optical disc which includes the record layer and the protective layer, and in which the record layer has at least a first area and a second area that are formed at different record densities; and that the disc discrimination portion executes predetermined processing for electric signals which are obtained by the photodetection portion when the light beam having the wavelength for the first optical disc or for the second optical disc has been projected from the light source onto respective areas of the first area and the second area, whereupon it performs the discrimination between the first optical disc and the second optical disc, on the basis of a result of the predetermined processing for the reflected light from the first area, and a result of the predetermined processing for the reflected light from the second area.

According to this apparatus, whether or not the optical disc inserted into the optical disc apparatus is the first optical disc or the second optical disc can be discriminated with only the light beam emitted from one light source, by utilizing the fact that the formations of the record densities in the first area and the second area are different between in the first optical disc and in the second optical disc. Therefore, even when the thicknesses of the protective layers for protecting the record layers are equal, it is permitted to provide an optical disc apparatus in which the discrimination between the first optical disc and the second optical disc can be accurately performed without changing-over light sources.

Besides, the invention may well consist in the optical disc apparatus of the above configuration, wherein thicknesses of the protective layers of the first optical disc and the second optical disc are equal; and the first areas are data areas in which data are recorded, and the second areas are lead-in areas in which management information items for managing the data areas are recorded.

In the existing standards, the configuration of the first optical disc corresponds to that of a DVD, and the configuration of the second optical disc corresponds to that of an HD-DVD. In accordance with this configuration, accordingly, it is permitted to provide an optical disc apparatus which can accurately perform the discrimination between the HD-DVD and the DVD where the thicknesses of the protective layers for protecting the record layers are equal, without changing-over light sources.

Besides, the invention may well consist in the optical disc apparatus of the above configuration, wherein the predetermined processing is a process which obtains an amplitude of a tracking error signal; and the sort of the optical disc is discriminated by comparing the amplitude of the tracking error signal in the first area and the amplitude of the tracking error signal in the second area.

According to this apparatus, using a configuration which has heretofore been included in an optical disc apparatus, it is possible to realize a configuration which can accurately discriminate the first optical disc and the second optical disc without changing-over light sources, even when the thicknesses of the protective layers for protecting the record layers are equal.

Besides, the invention may well consist in the optical disc apparatus of the above configuration, wherein the record density of the first area of the second optical disc is formed to be higher than that of the second area of the second optical disc, and the record density of the second area of the second optical disc is formed to be substantially equal to those of the first and second areas of the first optical disc; the light beam which is projected onto the respective areas of the first area and the second area is a light beam of a wavelength for use in reproduction of the first optical disc; and the predetermined processing is a process which permits a judgment on whether or not read of information is possible, as to each of the first area and the second area.

Also in the case of this configuration, using a configuration which has heretofore been included in an optical disc apparatus, it is possible to realize a configuration which can accurately discriminate the first optical disc and the second optical disc without changing-over light sources, even when the thicknesses of the protective layers for protecting the record layers are equal.

DETAILED DESCRIPTION OF THE PREFERRED EMBODIMENTS

While the contents of the present invention will now be described in detail, embodiments stated here are mere examples, and the invention shall not be restricted the embodiments.

First Embodiment

Figure 1:
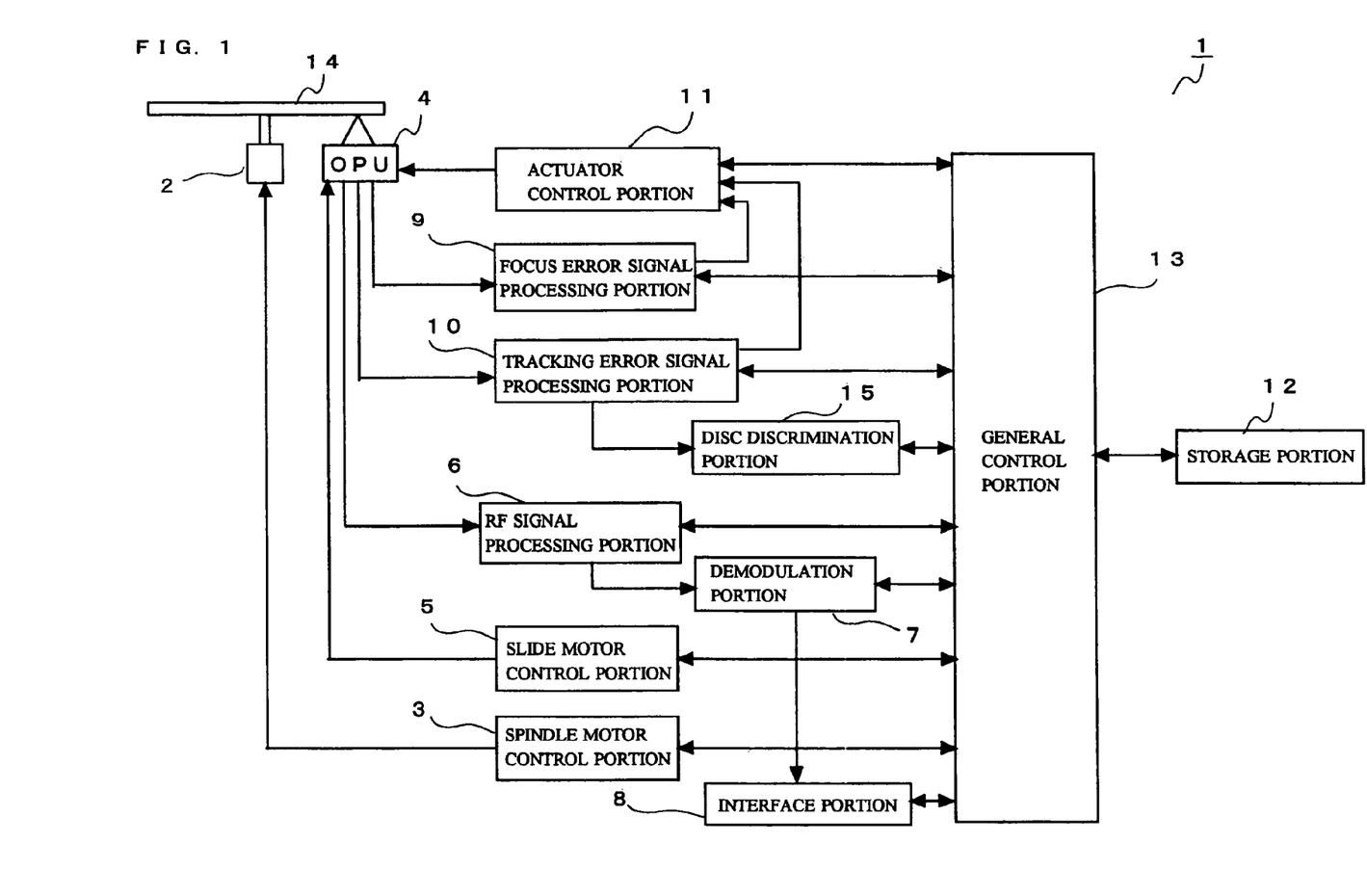
FIG. 1 is a block diagram showing the configuration of the optical disc apparatus of a first embodiment to which the optical-disc discrimination method of the present invention is applied.

First, there will be described the optical disc apparatus of a first embodiment to which the optical-disc discrimination method of the invention is applied. FIG. 1 is a block diagram showing the configuration of the optical disc apparatus 1 of the first embodiment. The optical disc apparatus 1 is configured so as to be capable of reproducing the information of an optical disc 14 and recording information onto the optical disc 14. Incidentally, the sorts of the optical discs 14 onto and from which the optical disc apparatus 1 can record and reproduce the information are a DVD and an HD-DVD.

Numeral 2 designates a spindle motor, and the optical disc 14 is detachably held by a chuck portion (not shown) which is disposed at the upper part of the spindle motor 2. Besides, in performing the record or reproduction of the information of the optical disc 14, the spindle motor 2 rotates the optical disc 14 continuously. The rotational control of the spindle motor 2 is performed by a spindle motor control portion 3.

Figure 2:
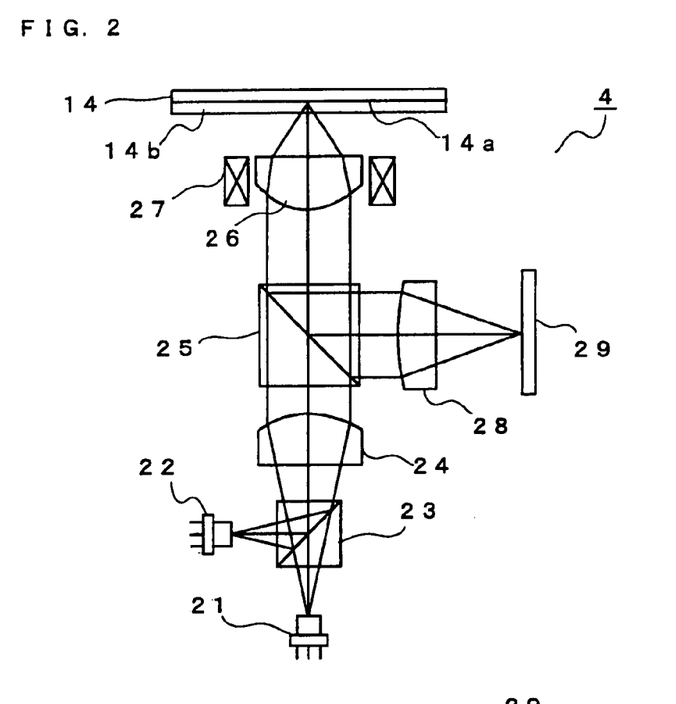
FIG. 2 is a schematic diagram showing the configuration of the optical system of an optical pickup which is included in the optical disc apparatus of the first embodiment.

Numeral 4 designates an optical pickup, by which a laser beam emitted from a light source is projected onto the optical disc 14 so as to permit the write of the information into the optical disc 14 or the read of the information recorded on the optical disc 14. FIG. 2 is a schematic diagram showing the optical system of the optical pickup 4. As shown in FIG. 2, the optical pickup 4 includes a first light source 21, a second light source 22, a color synthesis prism 23, a collimate lens 24, a beam splitter 25, an objective 26, a condensing lens 28 and a photodetector 29. Incidentally, the configuration of the optical system constituting the optical pickup is not restricted to the illustrated one, but various alterations are, of course, possible.

Both the first light source 21 and the second light source 22 are laser diodes (LDs). However, the first light source 21 is a light source corresponding to the HD-DVD, and it emits a laser beam of a wavelength band of, for example, 405 nm. The second light source 22 is a light source corresponding to the DVD, and it emits a laser beam of a wavelength band of, for example, 650 nm.

In the optical pickup 4, the light beams emitted from the light sources 21 and 22 have their optic axes made identical by the color synthesis prism 23, and they are made a collimated beam by the collimate lens 24. The collimated beam is transmitted through the beam splitter 25, and it is condensed by the objective 26 onto a record layer 14a in which the information of the optical disc 14 is recorded. Reflected light reflected from the record layer 14a is passed through the objective 26, it is reflected by the beam splitter 25, and it is condensed onto the light receiving portion of the photodetector 29 by the condensing lens 28. The photodetector 29 converts optical information which the received light beam has, into an electric signal.

Referring back to FIG. 1, a slide motor control portion 5 controls the drive of a slide motor, not shown, which is disposed so as to make the optical pickup 4 movable. Thus, the movement of the optical pickup 4 in the radial direction thereof is controlled.

An RF signal processing portion 6 processes an RF signal obtained by the photodetector 29 of the optical pickup 4, and feeds the processed signal to a demodulation portion 7.

The demodulation portion 7 demodulates data, and detects the error of the data. In a case where the error has been detected and where it is correctable, the demodulation portion 7 performs the correction process of the data and feeds the reproduced data to an interface portion 8. By the way, in a case where the reproduction error for which the correction process is impossible has occurred, the retry of the data is executed by a well-known method. Besides, the demodulation portion 7 plays the role of feeding a general control portion 13 with an error rate which is the occurrence proportion of the read errors of the data.

The interface portion 8 outputs the reproduced data fed from the demodulation portion 7, to a personal computer or the like external equipment not shown.

Figure 3:
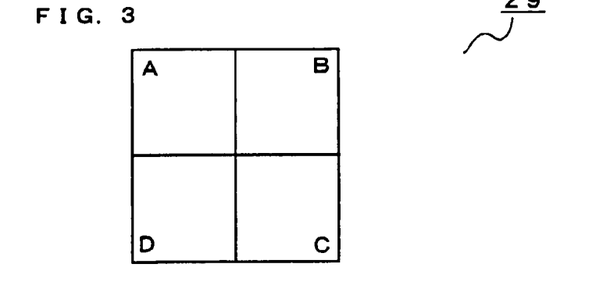
FIG. 3 is a plan view showing the configuration of the detection surfaces of a photodetector which is included in the optical pickup in the first embodiment.

A focus error signal processing portion 9 generates a focus error signal by using signals detected by the photodetector 29 of the optical pickup 4. FIG. 3 is a plan view showing the configuration of the detection surfaces of the photodetector 29. Incidentally, FIG. 3 is the view seen from the side of the condensing lens 28. The photodetector 29 has the detection surfaces A, B, C and D quartered as shown in FIG. 3, and the focus error signal processing portion 9 generates the focus error signal on the basis of the difference [(A+C)−(B+D)] of the diagonal sums of the detection signals from the respective detection surfaces A–D. The focus error signal generated by the focus error signal processing portion 9 is fed to an actuator control portion 11.

A tracking error signal processing portion 10 generates a tracking error signal by using the signals detected by the photodetector 29 of the optical pickup 4. The tracking error signal is generated on the basis of the difference [(A+B)−(C+D)] of the lateral sums of the detection signals from the respective detection surfaces A–D (refer to FIG. 3). The tracking error signal generated by the tracking error signal processing portion 10 is fed to the actuator control portion 11.

Besides, the tracking error signal generated by the tracking error signal processing portion 10 is fed to a disc discrimination portion 15 when the sort of the optical disc 14 is discriminated. The disc discrimination portion 15 discriminates whether the optical disc 14 inserted into the optical disc apparatus 1 is the DVD or the HD-DVD, on the basis of the amplitude of the tracking error signal. The details of the discrimination method for the optical disc 14, in the disc discrimination portion 15, will be stated later.

Incidentally, this embodiment has been so configured that the focus error signal and the tracking error signal are obtained by quartering the detection surfaces of the photodetector 29. However, the configuration for obtaining the focus error signal and the tracking error signal is not restricted to the illustrated one, but it can be variously altered within a scope not departing from the objects of the invention. By way of example, it is also allowed to adopt a configuration in which the focus error signal is obtained by a so-called "spot size method", while the tracking error signal is obtained by a so-called "correct far field method".

The actuator control portion 11 feeds a drive signal to an actuator 27 on which the objective 26 is mounted (refer to FIG. 2 as to the constituents 26 and 27), on the basis of the signals sent from the focus error signal processing portion 9 and the tracking error signal processing portion 10. The actuator 27 fed with the drive signal actuates the respective portions on the basis of the signals, thereby to perform a focus control in which the objective 26 is moved in a focusing direction parallel to the direction of the optic axis thereof, so as to be focused, and a tracking control in which the objective 26 is moved in a direction parallel to the radial direction of the optical disc 14, so as to bring the spot position of the laser beam into agreement with the position of a track formed in the optical disc 14.

The actuator control portion 11 controls the movements of the objective 27 also in the case of discriminating the sort of the optical disc 14 inserted into the optical disc apparatus 1, in the case of performing the pull-in operation of focusing, etc.

Further, the general control portion 13 controls the spindle motor control portion 3, the slide motor control portion 5, the RF signal processing portion 6, the demodulation portion 7, the interface portion 8, the focus error signal processing portion 9, the tracking error signal processing portion 10, the actuator control portion 11, and a storage portion 12 for storing information necessary for the controls, thereby to control the whole apparatus.

Figure 4:
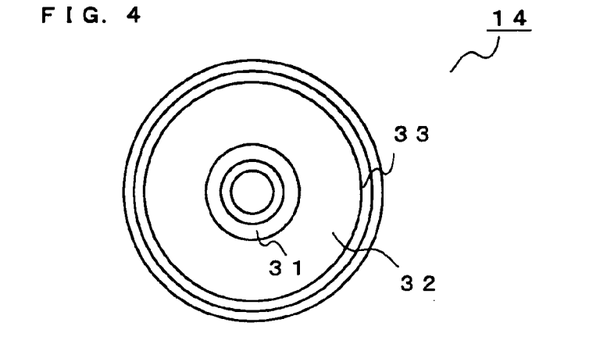
FIG. 4 is a schematic plan view showing a configurational example of the record layer of an optical disc which can be recorded and reproduced by the optical disc apparatus of the first embodiment.

Next, the configurations of the DVD and HD-DVD being the optical discs 14 which are recordable and reproducible by the optical disc apparatus 1 will be described by mentioning examples. FIG. 4 is a schematic plan view showing a configurational example of the record layer 14a of the optical disc 14. As shown in FIG. 4, the record layer 14a of the optical disc 14 is formed with a lead-in area 31 which exists on an inner peripheral side, a data area 32 which exists on the outer peripheral side of the lead-in area 31, and a lead-out area 33 which exists on the outer peripheral side of the data area 32. Incidentally, a protective layer 14b (refer to FIG. 2) which protects the record layer 14a is provided on the surface of the record layer 14a of the optical disc 14 in a manner to cover the record layer 14a, and the thicknesses of such protective layers 14b are equal between the DVD and the HD-DVD.

Management information for managing the information of the optical disc 14 or the data area 32, and so forth are recorded in the lead-in area 31. Data which chiefly become subjects for the reproduction and run, such as video data, audio data, content data and a computer program, are recorded in the data area 32. The lead-out area 33 is an area which indicates the end of the data area 32, and in which information is not especially recorded.

Regarding the DVD and the HD-DVD thus configured, points of difference to be stated below are existent. In the DVD, the lead-in area 31 and the data area 32 are formed at the same record density (in both the areas, the shortest mark length is 0.4 µm, and a track pitch is 0.74 µm). On the other hand, in the HD-DVD, the lead-in area 31 and the data area 32 have different record densities, and the lead-in area 31 is formed at a low record density (the shortest mark length is 0.408 µm, and a track pitch is 0.68 µm), while the data area 32 is formed at a high record density (the shortest mark length is 0.18 µm, and a track pitch is 0.34 µm).

In this embodiment, the DVD and the HD-DVD in which the thicknesses of the protective layers 14b for protecting the record layers 14a are equal are discriminated by utilizing the fact that the relationships of the record densities of the lead-in areas 31 and the data areas 32 are different between the DVD and the HD-DVD. In the optical disc apparatus 1, whether the optical disc 14 inserted into the optical disc apparatus 1 is the DVD or the HD-DVD is discriminated by a method as stated below.

Figure 5:
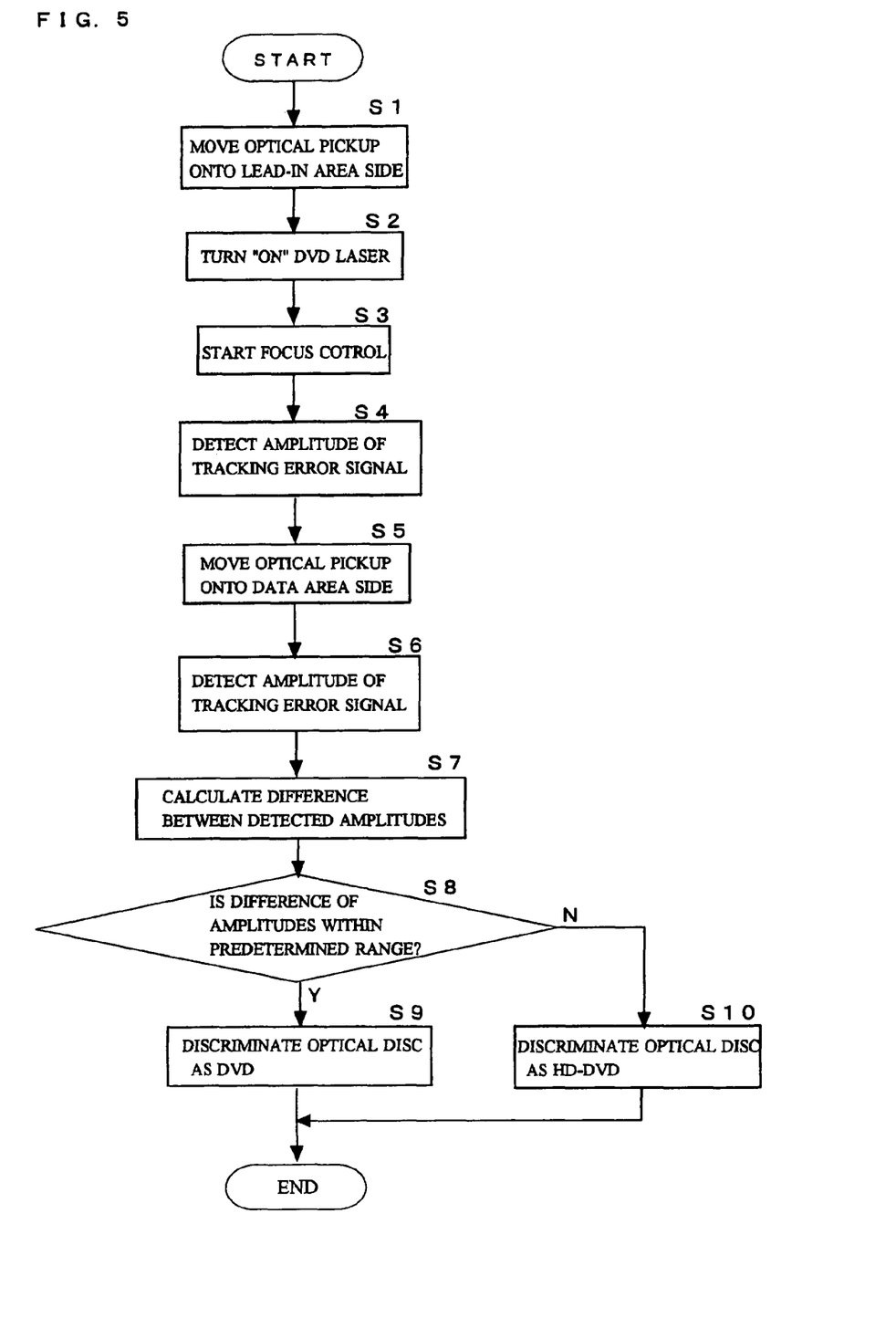
FIG. 5 is a flow chart showing a procedure which discriminates the sort of an optical disc in the optical disc apparatus of the first embodiment.

FIG. 5 is a flow chart showing a procedure which discriminates the sort of the optical disc 14 in the optical disc apparatus 1. Now, the discrimination of the optical disc 14 in the optical disc apparatus 1 will be described in accordance with the flow chart of FIG. 5.

When the optical disc 14 is inserted into the optical disc apparatus 1, the optical pickup 4 is moved to a predetermined position on the side of the lead-in area 31 (refer to FIG. 4) by the slide motor, not shown, which is controlled by the slide motor control portion 5 (regarding the constituents 4 and 5, refer to FIG. 1) (step S1). When the optical pickup 4 is moved to the predetermined position, the second light source 22 (the LD for the DVD) included in the optical pickup 4 is turned "ON", and a laser beam is emitted (step S2). The laser beam emitted here is projected onto the lead-in area 31 of the optical disc 14. Incidentally, although the procedure is configured here so as to turn "ON" the second light source 22, it may well be configured so as to turn "ON" the first light source 21 (the LD for the HD-DVD).

When the laser beam is projected onto the lead-in area 31, the actuator 27 on which the objective 26 is mounted (regarding the constituents 26 and 27, refer to FIG. 2) is moved by the control of the actuator control portion 11, and the laser beam is focused on the record layer 14a of the optical disc 14, whereby the focus control is started (step S3). Subsequently, in a state where the tracking control is not performed, the tracking error signal of one revolution cycle of the optical disc 14 as depends upon only the eccentricity of the optical disc 14 is generated, and the amplitude of the tracking error signal is detected by the disc discrimination portion 15 (refer to FIG. 1) (step S4). The amplitude of the tracking error signal detected here is stored in the storage portion 12.

Incidentally, the procedure here is configured so as to obtain the tracking error signal by utilizing the fact that the laser beam projected onto the record layer 14a of the optical disc 14 crosses the track of the optical disc 14 on account of the eccentricity which occurs due to the deviation between the center of the optical disc 14 and the rotational axis of the spindle motor 2 (refer to FIG. 1). Since, however, the nonexistence of the eccentricity is possible, it is also allowed to adopt, for example, a configuration in which a predetermined vibration is imparted to the objective 26 by the actuator 27 so that the objective 26 may vibrate in a tracking direction (a direction parallel to the radial direction of the optical disc 14).

When the amplitude of the tracking error signal in the lead-in area 31 is detected, the optical pickup 4 is moved to a predetermined position on the side of the data area 32 (refer to FIG. 4) by the slide motor (step S5). When the optical pickup 4 is moved to the predetermined position, the laser beam is projected onto the data area 32. Then, in the state where the tracking control is not performed, the tracking error signal of one revolution cycle of the optical disc 14 as depends upon only the eccentricity of the optical disc 14 is generated, and the amplitude of the tracking error signal is detected by the disc discrimination portion 15 (step S6). The amplitude of the tracking error signal detected here is stored in the storage portion 12. By the way, in a time period after the step S4 and till the execution of the step S6, the second light source 22 is held turned "ON", and also the focus control is being performed.

Subsequently, the difference between the amplitude of the tracking error signal detected in the lead-in area 31 and that of the tracking error signal detected in the data area 32 is calculated in the disc discrimination portion 15 (step S7). Whether or not the calculated difference between the amplitudes of the tracking error signals is within a predetermined range, is checked (step S8).

Here will be described the relationship between the amplitude of the tracking error signal and the record density of the record layer 14a of the optical disc 14. The magnitude of the amplitude of the tracking error signal has a relation to track pitches which are formed in the record layer 14a of the optical disc 14. When the number of the track pitches increases, the magnitude of the amplitude of the tracking error signal decreases. That is, when the record density of the record layer 14a of the optical disc 14 heightens, the amplitude of the tracking error signal becomes small.

For this reason, in a case where the record densities are equal between in the lead-in area 31 and in the data area 32 (the DVD corresponds to this case), the amplitudes of the tracking error signals become the same. In contrast, in a case where the lead-in area 31 is lower in the record density than the data area 32 (the HD-DVD corresponds to this case), the amplitude of the tracking error signal obtained in the lead-in area 31 becomes larger than that of the tracking error signal obtained in the data area 32. Accordingly, when the predetermined range at the step S8 is determined as a range value with which the lead-in area 31 and the data area 32 can be regarded as having the equal record densities, it is permitted to discriminate the DVD and the HD-DVD in accordance with the difference between the amplitudes of the tracking error signals.

More specifically, in a case where the difference between the amplitudes of the tracking error signals is within the predetermined range at the step S8, the record densities of the lead-in area 31 and the data area 32 can be regarded as being equal, the optical disc 14 is discriminated as the DVD (step S9). On the other hand, in a case where the difference between the amplitudes of the tracking error signals is not within the predetermined range, the record densities are regarded as being different between in the lead-in area 31 and in the data area 32, and hence, the optical disc 14 is discriminated as the HD-DVD (step S10).

Incidentally, the amplitude values of the tracking error signals change to some extent also on account of the fact that the reflection factors of the record layers 14a of the optical discs 14 change depending upon the difference of data record states in the record layers 14a (depending upon, for example, whether or not data are recorded), though the changes of the amplitude values attributed to the difference of the reflection factors are very small as compared with the changes of the amplitude values of the tracking errors attributed to the difference of the record densities as stated above. Therefore, in determining the above predetermined range, it may be determined in anticipation of a difference occurring on account of the different data record states.

It is also allowed to adopt, for example, a configuration in which the respective amplitude values of the tracking error signals detected at the steps S4 and S6 in anticipation of such differences of the amplitude values of the tracking error signals as occur depending upon whether or not the data are recorded in the data areas 32 are normalized by dividing them with total reflection light quantities (summation of reflection light quantities) obtained in the respective areas (lead-in areas 31 and data areas 32), whereupon the normalized amplitude values are compared.

Second Embodiment

Figure 6:
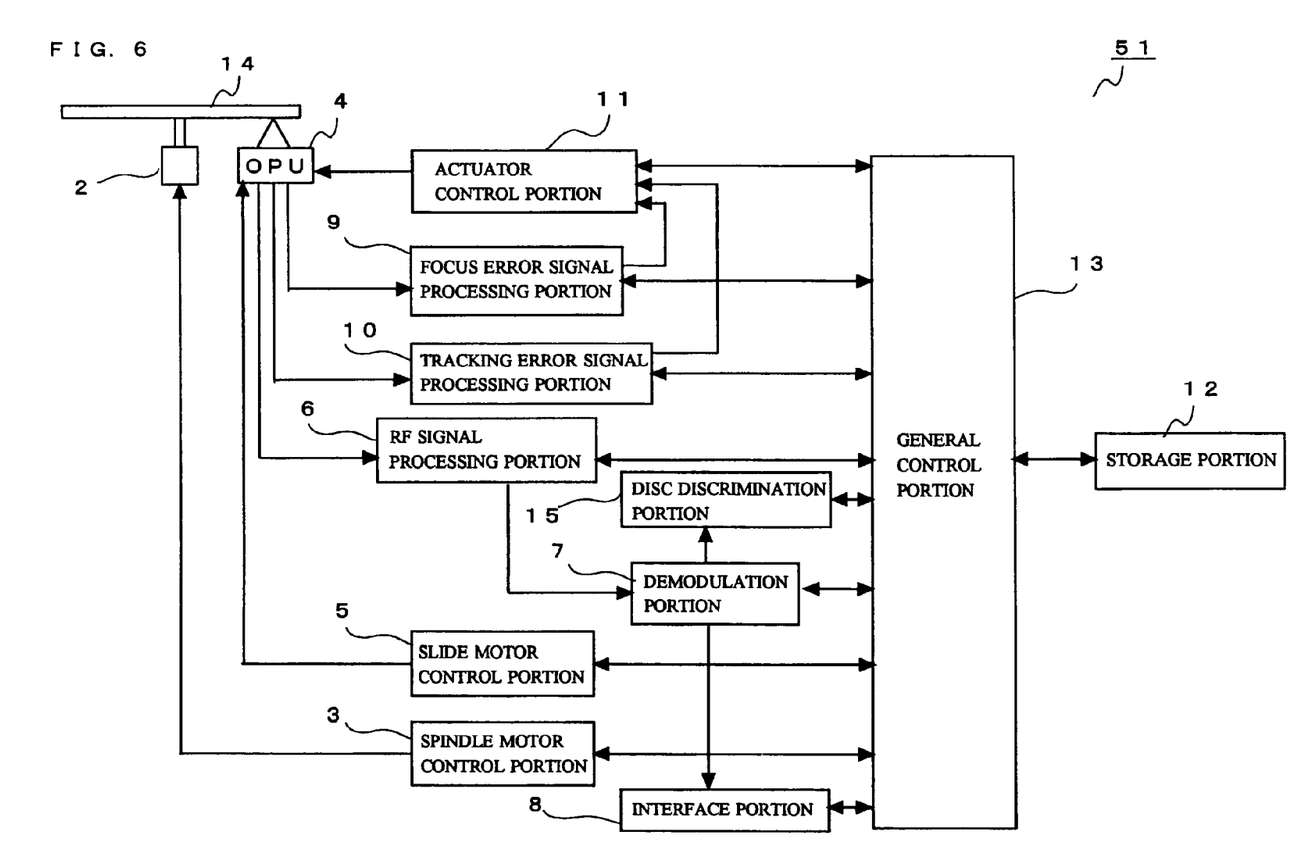
FIG. 6 is a block diagram showing the configuration of the optical disc apparatus of a second embodiment to which the optical-disc discrimination method of the invention is applied.

Next, there will be described the optical disc apparatus of a second embodiment to which the optical-disc discrimination method of the invention is applied. FIG. 6 is a block diagram showing the configuration of the optical disc apparatus 51 of the second embodiment. Also the optical disc apparatus 51 is capable of recording and reproducing information onto and from a DVD and an HD-DVD just like the optical disc apparatus 1 of the first embodiment. Hereinbelow, portions which correspond to those of the optical disc apparatus 1 of the first embodiment will be assigned the same reference numerals, and the description thereof shall be omitted unless especially required.

In the optical disc apparatus 1 of the first embodiment, the disc discrimination portion 15 has received information on a tracking error signal obtained by the tracking error signal processing portion 10. In the optical disc apparatus 51 of the second embodiment, however, a disc discrimination portion 15 is so configured that the information from the tracking error signal processing portion 10 is not received, but that information from a demodulation portion 7 is received, thereby to discriminate the sort of an optical disc 14. This point will be described below.

Like in the case of the first embodiment, the demodulation portion 7 demodulates data and detects the error of the data. In a case where the error has been detected and where it is correctable, the demodulation portion 7 performs the correction process of the data and feeds the reproduced data to an interface portion 8. By the way, in a case where the reproduction error for which the correction process is impossible has occurred, the retry of the data is executed by a well-known method. Besides, the demodulation portion 7 plays the role of feeding a general control portion 13 with an error rate which is the occurrence proportion of the read errors of the data.

Besides, in this embodiment, unlike in the case of the first embodiment, the demodulation portion 7 is configured so as to feed the error rate to the disc discrimination portion 15, in discriminating the sort of the optical disc 14. Incidentally, the error rate is sometimes unobtainable as in a case where the reproduction error for which the correction of the data is impossible has appeared. In such a case, the error rate is assumed to be, for example, 100%, and it is fed as a predetermined error rate.

Figure 7:
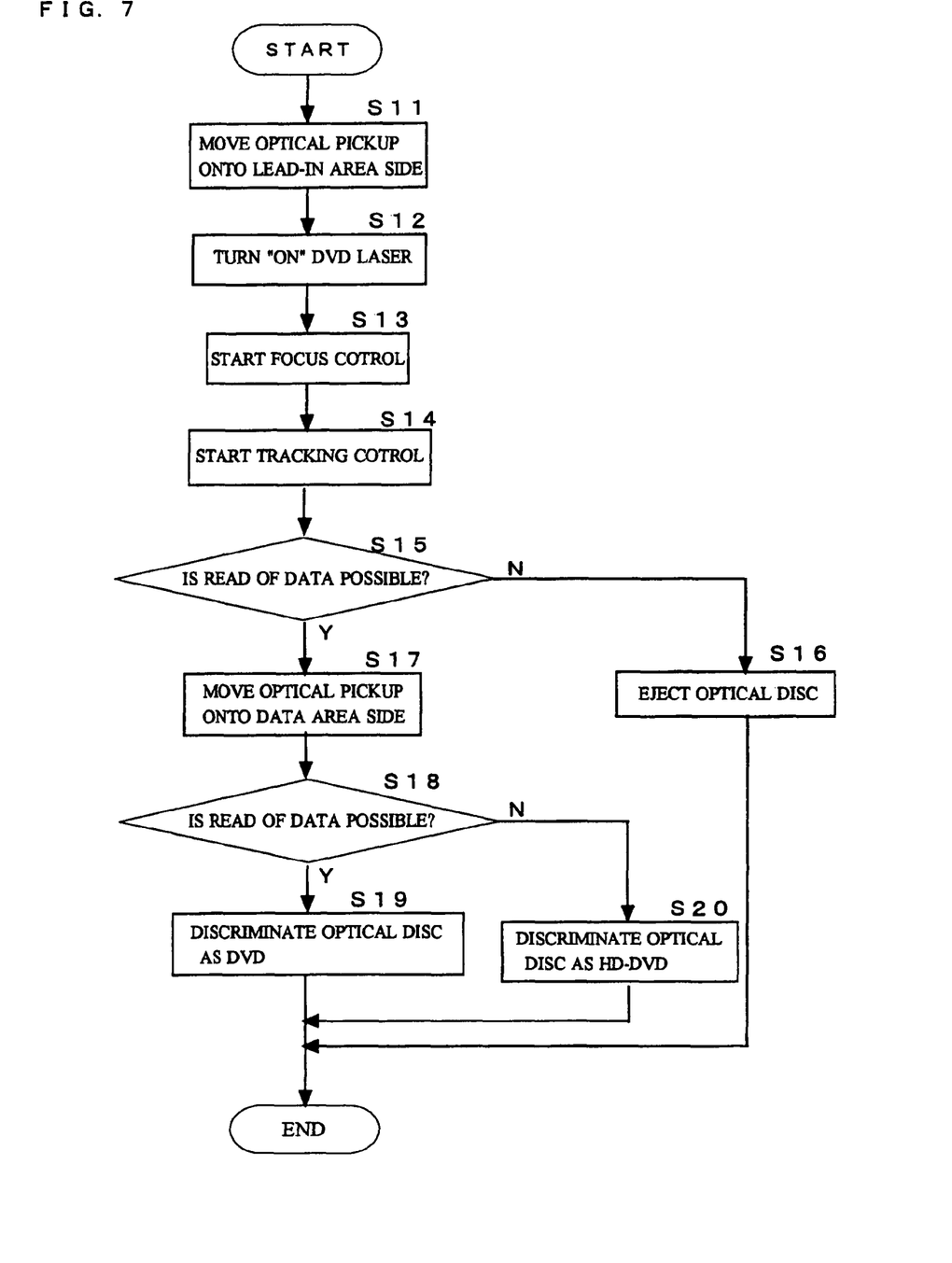
FIG. 7 is a flow chart showing a procedure which discriminates the sort of an optical disc in the optical disc apparatus of the second embodiment.

The disc discrimination portion 15 discriminates the sort of the optical disc 14 (whether the optical disc 14 is the DVD or the HD-DVD) on the basis of the data fed from the demodulation portion 7. This will be described in conjunction with a flow chart shown in FIG. 7. Incidentally, FIG. 7 is the flow chart showing a procedure which discriminates the sort of the optical disc 14 in the optical disc apparatus 51.

When the optical disc 14 is inserted into the optical disc apparatus 51, an optical pickup 4 is moved to a predetermined position on the side of a lead-in area 31 (refer to FIG. 4) by a slide motor, not shown, which is controlled by a slide motor control portion 5 (regarding the constituents 4 and 5, refer to FIG. 6) (step S11). When the optical pickup 4 is moved to the predetermined position, a second light source 22 (an LD for the DVD) included in the optical pickup 4 is turned "ON", and a laser beam is emitted (step S12). The laser beam emitted here is projected onto the lead-in area 31 of the optical disc 14.

When the laser beam is projected onto the lead-in area 31, an actuator 27 on which an objective 26 is mounted (regarding the constituents 26 and 27, refer to FIG. 2) is moved by the control of an actuator control portion 11, and the laser beam is focused on the record layer 14a of the optical disc 14, whereby a focus control is started (step S13). Subsequently, a tracking control is also started (step S14).

When the focus control and the tracking control are started, the collection of a reproduction (RF) signal is started, the error rate is fed from the demodulation portion 7 to the disc discrimination portion 15, and the disc discrimination portion 15 judges whether or not the read of the data is possible, in accordance with the information of the error rate (step S15). Regarding whether or not the read of the data is possible, the data is judged readable in a case where the value of the error rate is, at most, a predetermined value set by performing tests beforehand, and the data is judged unreadable in a case where the error rate is larger than the predetermined value. Incidentally, a time period for collecting the reproduction signal of the optical disc 14 may be a short time in which whether or not the read of the data is possible can be judged.

Here, although the lead-in areas 31 of the DVD and the HD-DVD are somewhat different in record densities, they are formed at the nearly equal record densities. Therefore, in the case where the laser beam for the DVD has been projected, the data of both the optical discs are judged readable (that is, the error rates become, at most, the predetermined value). For this reason, in a case where either of the DVD and the HD-DVD is inserted into the optical disc apparatus 51, it does not occur as a general rule that the data becomes unreadable at the step S14. However, the read of the data is sometimes judged impossible on account of the flaw, the stain or the like of the optical disc 14 or the insertion of an optical disc which is neither the DVD nor the HD-DVD, into the optical disc apparatus 51. In such a case, the optical disc 14 is ejected from the optical disc apparatus 51 (step S16).

Incidentally, apart from the configuration in which, as in this embodiment, the optical disc 14 is ejected from the optical disc apparatus 51 as soon as the read of the data has been judged impossible at the step S15, it is also allowed to adopt, for example, a configuration in which the position of the optical pickup 4 is moved to a plurality of positions within the lead-in area 31, and the optical disc 14 is ejected out of the optical disc apparatus 51 only in a case where the read of the data has been judged impossible at all the positions.

In a case where the read of the data of the optical disc 14 has been judged possible, the optical pickup 4 is moved to a predetermined position on the side of a data area 32 (refer to FIG. 4) by the slide motor (step S17). When the optical pickup 4 is moved to the predetermined position, the collection of a reproduction (RF) signal is started, the error rate is fed from the demodulation portion 7 to the disc discrimination portion 15, and the disc discrimination portion 15 judges whether or not the read of the data is possible, in accordance with the information of the error rate (step S18). Incidentally, also in this case, a time period for collecting the reproduction signal may be a short time in which whether or not the read of the data is possible can be judged.

Here, the laser beam for the DVD is projected onto the optical disc 14. Therefore, in a case where the DVD is inserted into the optical disc apparatus 51, the error rate becomes, at most, the predetermined value, and the read of the data is judged possible. On the other hand, in a case where the HD-DVD is inserted into the optical disc apparatus 51, the data area 32 is configured at a higher record density than in the DVD, and hence, the error rate becomes extraordinarily high under the influence of inter-symbol interference. Consequently, the error rate becomes larger than the predetermined value, and the read of the data is judged impossible.

Accordingly, in a case where the read of the data has been judged possible at the step S18, the data of the optical disc 14 inserted into the optical disc apparatus 51 are readable in both the lead-in area 31 and the data area 32. Therefore, the record densities of the lead-in area 31 and the data area 32 are judged equal, and the optical disc 14 is discriminated as the DVD (step S19). On the other hand, in a case where the read of the data has been judged impossible at the step S18, the optical disc 14 inserted into the optical disc apparatus 51 is judged as having different record densities in the lead-in area 31 and the data area 32, and it is discriminated as the HD-DVD (step S20).

Incidentally, at the judgment of whether or not the read of the data is possible at the step S18, there is also considered a case where, in spite of the DVD, a flaw, a stain or the like appears at part of the data area 32, so the read of the data is judged impossible on account of the flaw, the stain or the like. Therefore, it is also allowed to adopt, for example, a configuration in which, in judging if the read of the data is possible, the RF signal is collected at a plurality of positions so as to discriminate the optical disc 14.

(Others)

In the first and second embodiments described above, the optical disc apparatuses have been configured so as to record and reproduce information onto and from only the DVD and the HD-DVD. However, the optical disc apparatuses are not restrictive, but an optical disc apparatus capable of recording and reproducing information also onto and from a CD, a BD (Blu-ray Disc), etc. may well be configured. In this case, it is also allowed to adopt, for example, a configuration in which the invention is applied to the discrimination between the DVD and the HD-DVD, and in which the generation timing of the S-shaped waveform of a focus error signal is employed for discriminating the other discs. Besides, the invention is, of course, applicable to a reproduction-only optical disc apparatus.

Further, the invention is applied to the discrimination between the DVD and the HD-DVD in the existing standards. However, this aspect is not restrictive, but the invention is applicable to the discrimination between optical discs one of which has equal record densities in all the areas of a record layer and the other of which has two sorts of areas of different record densities, as in the DVD and the HD-DVD.

What is claimed is:

1. An optical-disc discrimination method for discriminating:

a first optical disc which includes a record layer for recording data therein, and a protective layer for protecting the record layer, and in which the record layer has at least a first area and a second area that are formed at equal record densities; and a second optical disc which includes the record layer and the protective layer, and in which the record layer has at least a first area and a second area that are formed at different record densities; comprising the steps of:

projecting a light beam which has a wavelength for the first optical disc or for the second optical disc, onto respective areas of the first area and the second area, and detecting respective reflected lights which are reflected from the first area and the second area on the basis of the projections of the light beam, by a photodetection portion;

executing predetermined processing for electric signals which are outputted from the photodetection portion; and discriminating whether an optical disc is the first optical disc or the second optical disc, on the basis of a result of the predetermined processing for the reflected light from the first area, and a result of the predetermined processing for the reflected light from the second area, wherein:

thicknesses of the protective layers of the first optical disc and the second optical disc are equal;

the first areas are data areas in which data are recorded, and the second areas are lead-in areas in which management information items for managing the data areas are recorded;

a record density of the first area of the second optical disc is higher than a record density of the second area of the second optical disc, and the record density of the second area of the second optical disc is substantially equal to record densities of the first and second areas of the first optical disc;

the light beam which is projected onto the first area and the second area is a light beam of a wavelength for use in reproduction of the first optical disc; and the predetermined processing is a process of obtaining an error rate and making a judgment on whether or not read of information is possible.

2. An optical disc apparatus comprising:

a plurality of light sources which emit light beams of different wavelengths, respectively;

an objective which condenses the light beam emitted from the light source, onto a record layer of an optical disc;

a photodetection portion which receives reflected light reflected from the record layer; and a disc discrimination portion which discriminates the optical disc inserted into the apparatus; wherein:

the apparatus is configured so as to be capable of reproduction or record and reproduction of:

a first optical disc which includes a record layer for recording data therein, and a protective layer for protecting the record layer, and in which the record layer has at least a first area and a second area that are formed at equal record densities; and a second optical disc which includes the record layer and the protective layer, and in which the record layer has at least a first area and a second area that are formed at different record densities;

said disc discrimination portion executes predetermined processing for electric signals which are obtained by said photodetection portion when the light beam having the wavelength for the first optical disc or for the second optical disc has been projected from the light source onto respective areas of the first area and the second area, and it performs the discrimination between the first optical disc and the second optical disc, on the basis of a result of the predetermined processing for the reflected light from the first area, and a result of the predetermined processing for the reflected light from the second area, wherein:

thicknesses of the protective layers of the first optical disc and the second optical disc are equal;

the first areas are data areas in which data are recorded, and the second areas are lead-in areas in which management information items for managing the data areas are recorded;

a record density of the first area of the second optical disc is higher than a record density of the second area of the second optical disc, and the record density of the second area of the second optical disc is substantially equal to record densities of the first and second areas of the first optical disc;

the light beam which is projected onto the first area and the second area is a light beam of a wavelength for use in reproduction of the first optical disc; and the predetermined processing is a process of obtaining an error rate and making a judgment on whether or not read of information is possible.

\* \* \* \* \*